Patented Oct. 26, 1926.

1,604,260

UNITED STATES PATENT OFFICE.

PATRICK FRANCIS CONNELLY, OF LITTLE ROCK, ARKANSAS.

PAVING MIXTURE.

No Drawing.   Application filed September 30, 1924.   Serial No. 740,845.

The pavement forming the subject-matter of this application comprises a body which affords the desired rigidity, and for this purpose, stone, and generally broken stone, will answer. The constituent portions of the body of the pavement are held together by a binder, and it is preferred to use a waterproof binder, such as bitumen. The cohesion of the binder is weakened to such an extent that the compound may be used without heating, and, with this end in mind, the mixture may embody a volatile solvent for the binder, such as gasoline. The stone or the like, which constitutes the body, should be clean, in order that the binder may coat the stone, and, further, the binder should not be permitted to return too rapidly to its point of maximum adhesive strength, as the gasoline or the like evaporates. Coal oil is an ingredient having both of the properties last-above called for. Lime may be used to preserve the plasticity of the bitumen content indefinitely.

A pavement made in accordance with the disclosure of this application, can be handled and placed hot or cold without much regard to temperature. The material is of such nature that it can be rolled or tamped into form. The pavement claimed has the desired rigidity to withstand creeping or displacement in hot weather. It is sufficiently elastic and ductile and will not crack or disintegrate; and is of such a nature that it may be removed after use in one location and be placed in service at other points, without requiring heating or addition of any new material.

It is suggested that the ingredients of the mixture be compounded in about the following proportions:—

|  | Per cent. |
|---|---|
| Stone | 75 to 95 |
| Bitumen | 5 to 10 |
| Hydrated lime | 0.5 to 1.5 |
| Gasoline | 0.5 to 1 |
| Coal oil | 0.5 to 1 |

What is claimed is:—

A composition of matter for use in making the main body part of a pavement, and comprising—

|  | Per cent. |
|---|---|
| Hydrated lime | 0.5 to 1.5 |
| Broken stone | 75.0 to 95 |
| Coal oil | 0.5 to 1 |
| Bitumen | 5 to 10 |
| Gasoline | 0.5 to 1 |

In testimony that I claim the foregoing as my own, I have hereto affixed my signature.

PATRICK FRANCIS CONNELLY.